US012598078B2

(12) United States Patent
Das et al.

(10) Patent No.: US 12,598,078 B2
(45) Date of Patent: Apr. 7, 2026

(54) NETWORK ACCESS USING HARDWARE-BASED SECURITY

(71) Applicant: Sophos Limited, Abingdon (GB)

(72) Inventors: Dipak Kr. Das, Bangalore (IN); Avni Bhupendrakumar Wala, Bangalore (IN); John Frederick Dawson, Pittsburgh, PA (US); Hariprasad Nekkare Gururaj, Bangalore (IN); Anirban Debnath, Bengaluru (IN)

(73) Assignee: Sophos Limited, Abingdon (GB)

( * ) Notice: Subject to any disclaimer, the term of this patent is extended or adjusted under 35 U.S.C. 154(b) by 256 days.

(21) Appl. No.: 18/110,051

(22) Filed: Feb. 15, 2023

(65) Prior Publication Data

US 2024/0146536 A1     May 2, 2024

(30) Foreign Application Priority Data

Nov. 2, 2022   (IN) .............................. 202211062663
Nov. 15, 2022   (IN) .............................. 202211062663

(51) Int. Cl.
H04L 29/06       (2006.01)
H04L 9/32        (2006.01)

(52) U.S. Cl.
CPC .......... H04L 9/3247 (2013.01); H04L 9/3213 (2013.01); H04L 9/3271 (2013.01)

(58) Field of Classification Search
CPC ............................ H04L 9/3247; H04L 9/3213
See application file for complete search history.

(56) References Cited

U.S. PATENT DOCUMENTS

| | | | | | |
|---|---|---|---|---|---|
| 9,853,977 | B1 * | 12/2017 | Laucius | ............. | H04L 63/0884 |
| 9,979,550 | B1 * | 5/2018 | Fiedler | ................. | H04L 9/3247 |
| 10,154,023 | B1 * | 12/2018 | Nossik | ................. | G06F 9/4416 |
| 11,836,254 | B2 * | 12/2023 | Lewis | ..................... | G06F 21/57 |
| 2009/0113533 | A1 * | 4/2009 | Genty | ..................... | G06F 21/41 |
| | | | | | 726/7 |

(Continued)

OTHER PUBLICATIONS

Juhyeng Han et al., Toward Scaling Hardware Security Module for Emerging Cloud Services, Oct. 27, 2019, ACM, pp. 1-6. (Year: 2019).*

(Continued)

*Primary Examiner* — Kari L Schmidt
*Assistant Examiner* — Fahimeh Mohammadi
(74) *Attorney, Agent, or Firm* — Strategic Patents, P.C.

(57)     ABSTRACT

An endpoint device uses hardware-based security to authenticate to an enterprise network. For example, an endpoint device such as network hardware or an end user device can request authentication in order to join an enterprise network that is managed by a computing platform such as a threat management facility. In one aspect, an authenticator at the computing platform sends a challenge payload in response to the request from the endpoint device. The endpoint device may then sign the challenge payload with a hardware-based security system that was bound to the endpoint device at manufacture, and return a response to the authenticator that includes the signed challenge payload. The authenticator can cryptographically validate the response and generate an authentication token for use by the endpoint device when joining the enterprise network.

20 Claims, 7 Drawing Sheets

(56)                References Cited

U.S. PATENT DOCUMENTS

| | | | | |
|---|---|---|---|---|
| 2014/0123124 | A1* | 5/2014 | Gray | G06F 8/654 |
| | | | | 717/170 |
| 2020/0320199 | A1* | 10/2020 | Sheth | H04L 63/123 |
| 2021/0036867 | A1* | 2/2021 | Attard | G06Q 10/10 |
| 2021/0103439 | A1* | 4/2021 | Mellqvist | H04W 12/041 |
| 2021/0288954 | A1* | 9/2021 | Saravanan | H04L 63/0807 |
| 2022/0045848 | A1* | 2/2022 | Hulshof | H04L 9/3271 |
| 2022/0141019 | A1* | 5/2022 | Thomas | H04L 9/30 |
| | | | | 713/159 |
| 2022/0365788 | A1* | 11/2022 | Koo | G06F 9/4401 |
| 2023/0009739 | A1* | 1/2023 | Ponnuswamy | H04L 9/3213 |
| 2023/0216693 | A1* | 7/2023 | Singh | H04L 9/30 |
| | | | | 713/176 |

OTHER PUBLICATIONS

Nico Mexis et al., A Lightweight Architecture for Hardware-Based Security in the Emerging Era of Systems of Systems, Jun. 30, 2021, ACM, pp. 1-25. (Year: 2021).*

Michael Roland et al., Digital Signature Records for the NFC Data Exchange Format, Jun. 3, 2010, IEEE, pp. 71-76. (Year: 2010).*

Mehdi Akbari Gurabi et al., Hardware based Two-Factor User Authentication for the Internet of Things, Aug. 30, 2018, IEEE, pp. 1081-1086. (Year: 2018).*

UKIPO, "UK Application No. 2316761.2 Search and Examination Report mailed Apr. 26, 2024", 8 pages.

Das, D. , "Zero Touch Provisioning IOT or Other Devices on cloud", https://medium.com/@dd.identity/zero-touch-provisioning-iot-or-other-devices-on-cloud-79a77af9304e Jun. 6, 2022 , 5 Pages.

Das, Dipak Kr , "Authorisation Between your IOT Devices and Cloud", https://medium.com/@dd.identity/authorisation-between-your-iot-devices-and-cloud-dd9fde2c1e0f Jun. 27, 2022 , 5 Pages.

UKIPO, , "UK Application No. 2316761.2 Examination Report mailed May 2, 2025", , 5 pages.

A Menezes, et al., "Handbook of Applied Cryptography", CRC Press, See protocol 12.40, p. 511, Oct. 16, 1996 , p. 511.

UKIPO, , "UK Application No. 2316761.2 Examination Report mailed Feb. 23, 2026", 6 pages.

* cited by examiner

FIG. 2

NETWORK ACCESS USING HARDWARE-BASED SECURITY

CROSS-REFERENCE TO RELATED APPLICATIONS

This application claims priority to Indian Patent Application No. 202211062663 filed on Nov. 15, 2022, which claims priority to Indian Provisional Patent Application No. 202211062663 filed on Nov. 2, 2022, where the entire content of each of the foregoing is hereby incorporated by reference.

BACKGROUND

Authentication tokens may be used by devices to join an enterprise network. This general technique may be used, e.g., to ensure that network hardware such as gateways, switches, access points, and the like are authenticated to, and being managed by, a threat management facility that manages security for the enterprise network. A typical token will only be valid for a finite period, and therefore devices may also receive a refresh token that supports periodic reauthentication unless/until the refresh token is revoked. The use of a refresh token can mitigate replay attacks while facilitating express revocation from a security infrastructure. However, this refresh token must be stored somewhere in persistent storage on the endpoint device, thus making the refresh token vulnerable to other security attacks.

There remains a need for improved techniques for authenticating endpoint devices to a computing platform such as a cloud-based threat management facility.

SUMMARY

An endpoint device uses hardware-based security to authenticate to an enterprise network. For example, an endpoint device such as network hardware or an end user device can request authentication in order to join an enterprise network that is managed by a computing platform such as a threat management facility. In one aspect, an authenticator at the computing platform sends a challenge payload in response to the request from the endpoint device. The endpoint device may then sign the challenge payload with a hardware-based security system that was bound to the endpoint device at manufacture, and return a response to the authenticator that includes the signed challenge payload. The authenticator can cryptographically validate the response and generate an authentication token for use by the endpoint device when joining the enterprise network.

In one aspect, a method for operating a computing platform to authenticate an endpoint device at the computing platform disclosed herein may include the steps of: receiving a request from the endpoint device for authentication at the computing platform; generating a data packet; signing the data packet with a key, thereby providing a first digital signature; sending a challenge payload to the endpoint device, the challenge payload including a data packet and the first digital signature; receiving a response to the challenge payload from the endpoint device, the response including an endpoint device certificate, the challenge payload, and a second digital signature for the challenge payload from the endpoint device; validating the response to the challenge payload by: validating a certificate chain for the endpoint device certificate, validating the second digital signature for the challenge payload, and validating an expiry of the data packet in the challenge payload; and in response to validating the challenge payload, sending an authentication token to the endpoint device.

Implementations may include one or more of the following features. Validating the second digital signature for the challenge payload may include validating the second digital signature with a public key associated with the endpoint device certificate. The method may further include sending an alert to the endpoint device in response to a failure to validate the certificate chain or a failure to validate the second digital signature. The computing platform may include a threat management facility for an enterprise network. The computing platform may include a cloud computing platform.

In one aspect, a method for operating an endpoint device to authenticate the endpoint device at a computing platform disclosed herein may include the steps of: sending a request for authentication to the computing platform; receiving a challenge payload from the computing platform; fetching an endpoint device certificate from a trusted platform module on the endpoint device; signing the challenge payload with a digital signature from the trusted platform module; sending a challenge response to the computing platform based on the challenge payload, the challenge response including the endpoint device certificate, the challenge payload, and the digital signature; receiving an authentication token from the computing platform in response to the challenge response; authenticating the endpoint device at the computing platform with the authentication token; and accessing services of the computing platform from the endpoint device with the authentication token.

Implementations may include one or more of the following features. The challenge payload may include a random data segment and an expiration date. The challenge payload may include a different digital signature for the random data segment from the computing platform. The method may further include validating the computing platform at the endpoint device with this digital signature and the random data segment. Sending the request for authentication may include sending a reauthentication request in response to an expiration of a prior authentication token. Sending the request for authentication may include sending the request for authentication in response to a boot up of the endpoint device. The authentication token may have a valid time of an hour or less. The method may further include sending a second request to the computing platform in response to an expiration of the authentication token. The method may further include installing the trusted platform module and the endpoint device certificate in a trusted platform module chip during manufacturing of the endpoint device. The endpoint device may include security hardware for an enterprise network. The endpoint device may include at least one of a gateway, a firewall, a wireless access point, and a switch.

In one aspect, a system disclosed herein may include an endpoint device connected to an enterprise network; and a computing platform including an authenticator for managing access by the endpoint device to the computing platform, the authenticator configured to receive a request from the endpoint device for authentication at the computing platform, to generate a random data segment, to send the random data segment to the endpoint device, to receive a response data packet from the endpoint device, to determine a validity of the response data packet with one or more cryptographic validation tests of the response data packet, and to send an authentication token to the endpoint device if the response data packet passes the one or more cryptographic validation tests.

Implementations may include one or more of the following features. The computing platform may include a threat management facility for the enterprise network. The endpoint device may include a network device for the enterprise network, and the computing platform may manage security for the enterprise network.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 2 depicts a block diagram of a threat management system.

DETAILED DESCRIPTION

Figure 1:
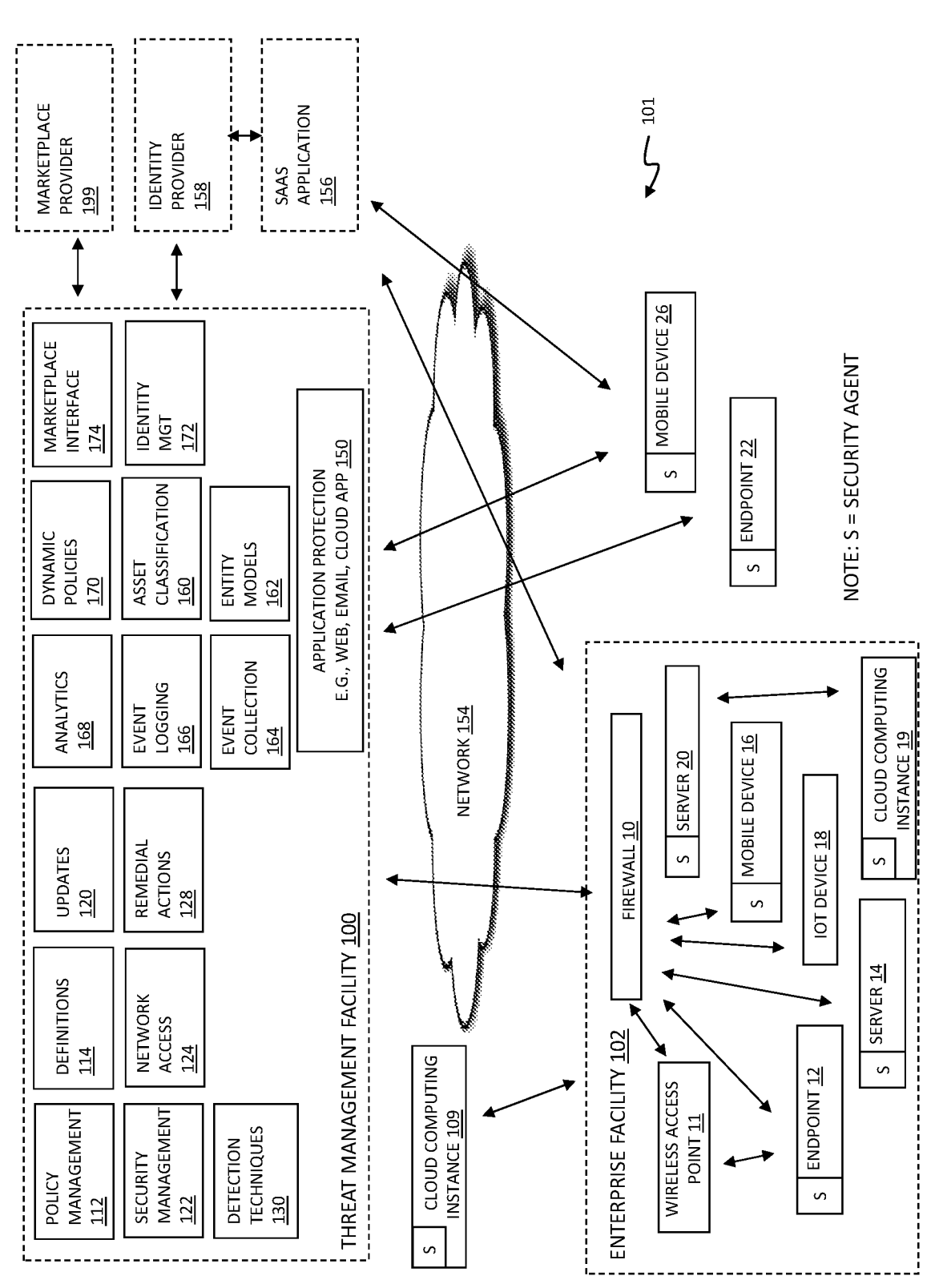
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, the threat management facility 100 may include, or may be connected to a security agent S such as a local security agent deployed on one or more other entities within the threat management system 101. The facilities of the threat management facility 100, and/or a security agent S therefor, may be deployed on the same physical hardware or logical resource as a gateway for an enterprise facility 102, a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 90 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a blacklist, an allowed list, a whitelist, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 9, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 92 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 92 and policy management facility 112 may push information to the enterprise facility 102 network and/or the compute instances 10-26, the enterprise facility 102 network and/or compute instances 10-26 may pull information from the security facility 92 and policy management facility 112, or there may be a combination of pushing and pulling of information. For example, the enterprise facility 102 network and/or compute instances 10-26 may pull update information from the security facility 92 and policy management facility 112 via the update facility 120, an update request may be based on a time period, by a certain time, by a date, on demand, or the like. In another example, the security facility 92 and policy management facility 112 may push the information to the enterprise facility's 102 network and/or compute instances 10-26 by providing notification that there are updates available for download and/or transmitting the information. In an embodiment, the policy management facility 112 and the security facility 92 may work in concert with the update management facility 90 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 94 may restrict access to certain applications, networks, files, printers, servers, databases, and so on. In addition, the network access facility 94 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 94 may determine if a given compute instance 10-22 should be granted access to a requested network location, e.g., inside or outside of the enterprise facility 102. Network access facility 94 may determine if a compute instance 22, 26 such as a device outside the enterprise facility 102 may access the enterprise facility 102. For example, in some cases, the policies may require that when certain policy violations are detected, certain network access is denied. The network access facility 94 may communicate remedial actions that are necessary or helpful to bring a device back into compliance with policy as described below with respect to the remedial action facility 128. Aspects of the network access facility 94 may be provided, for example, in the security agent of the endpoint 12, in a wireless access point 11, in a firewall 10, as part of application protection 150 provided by the cloud, and so on.

In an embodiment, the network access facility 94 may have access to policies that include one or more of a block list, an allowed list, an unacceptable network site database, an acceptable network site database, a network site reputation database, or the like of network access locations that may or may not be accessed by the client facility. Additionally, the network access facility 94 may use rule evaluation to parse network access requests and apply policies. The network access rule facility 94 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 92 may take any steps or deploy any measures suitable for addressing a detection of a threat, potential threat, policy violation or other event, code or activity that might compromise security of a computing instance 10-26 or the enterprise facility 102.

Figure 2:
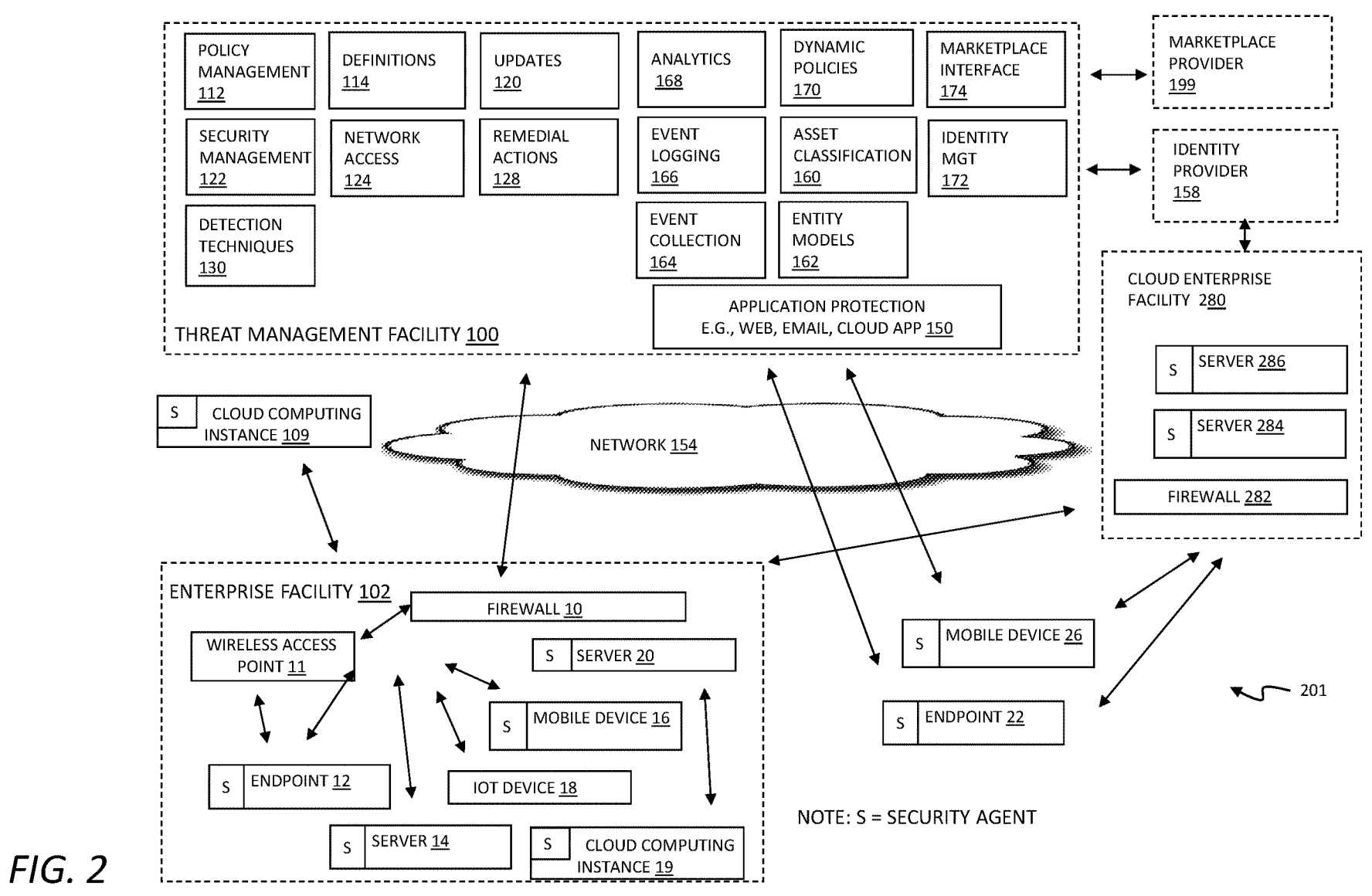

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
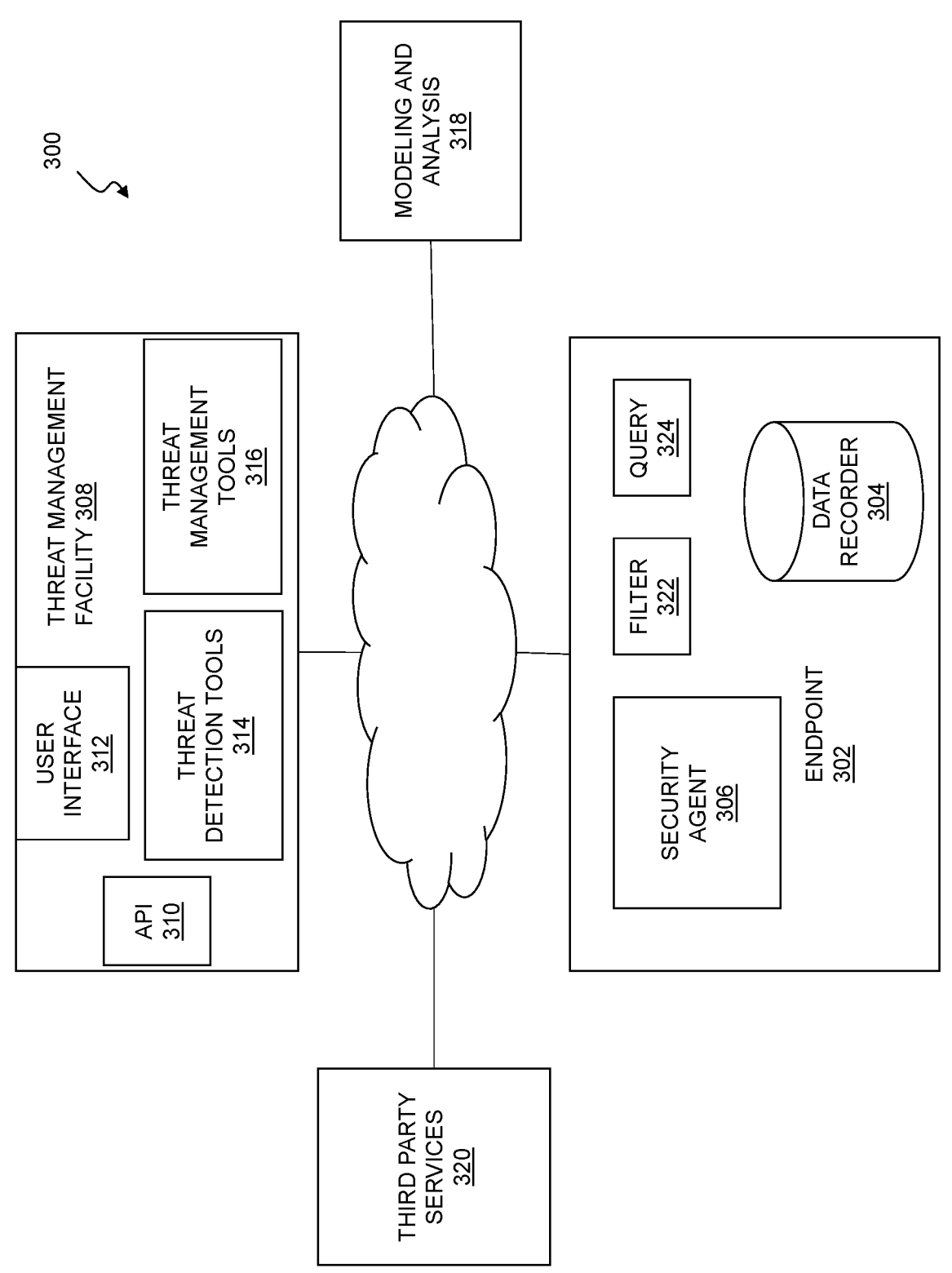
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g., models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
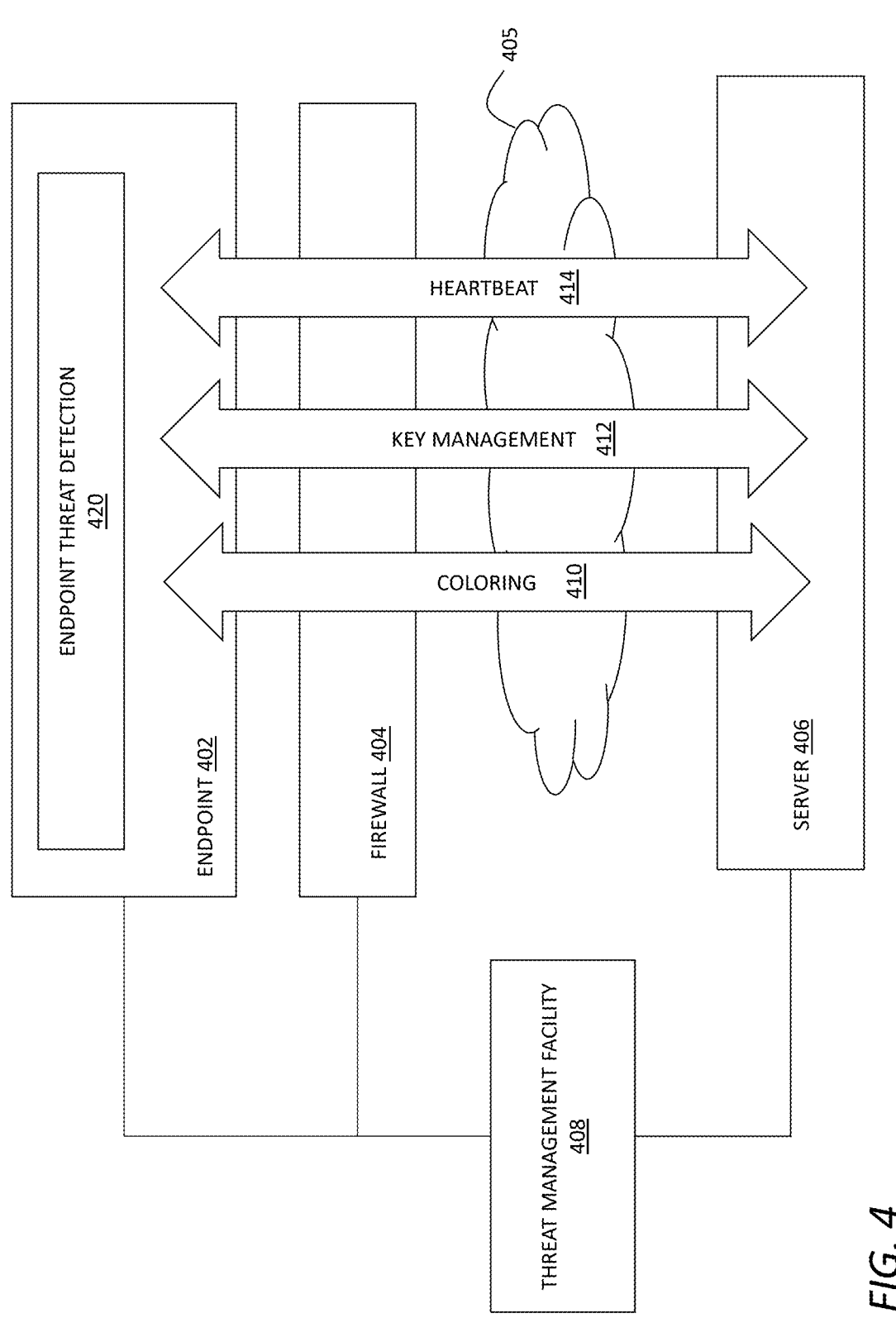
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
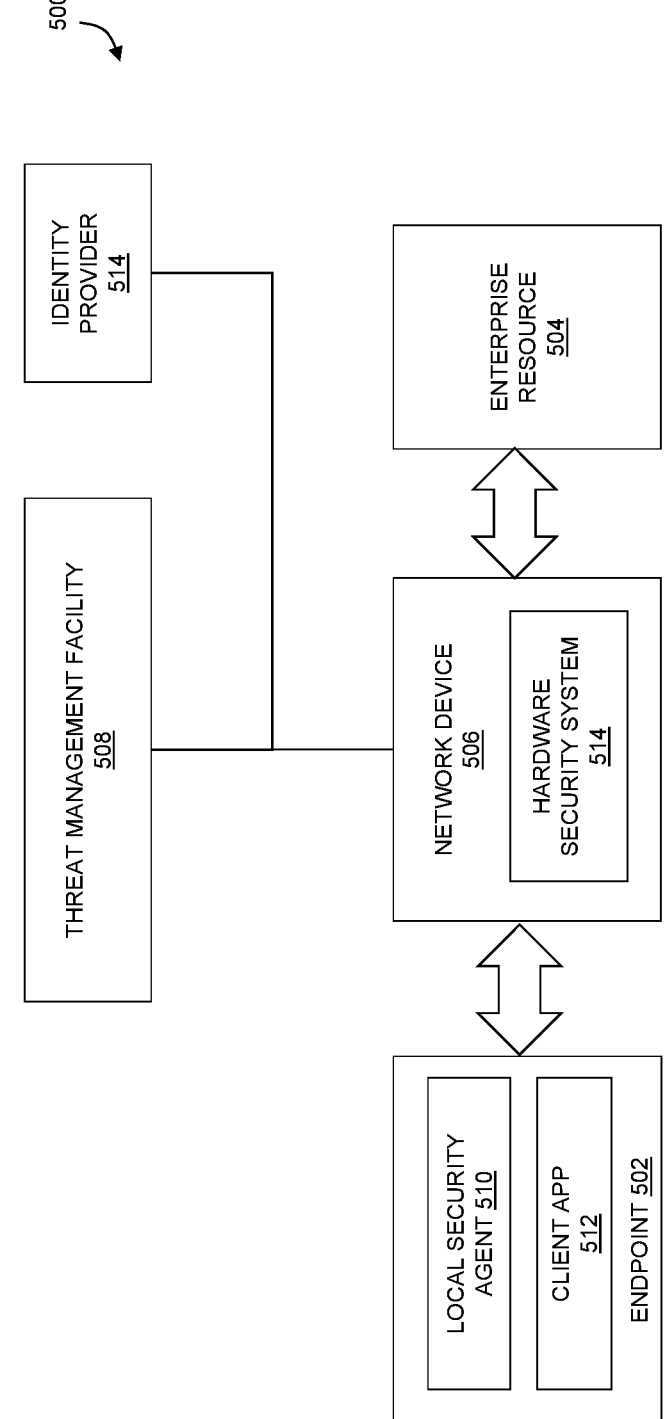
FIG. 5 shows an enterprise network.

FIG. 5 shows an enterprise network. In the enterprise network 500, an endpoint 502 may access an enterprise resource 504 through a network device 506, with security for the enterprise network managed by a threat management facility 508. The enterprise network 500, endpoint 502, enterprise resource 504, network device 506, and threat management facility 508 may be any such elements as described herein.

The endpoint 502 may include any of the endpoints, endpoint devices, compute instances, or other physical or virtual computing devices described herein. In one aspect, a user of the endpoint 502 may request or seek to use the protected resource 504. As described herein, the endpoint 502 may execute a local security agent 510 that locally manages security of the endpoint 502 in cooperation with the threat management facility 508. The endpoint 502 may also execute a local application such as a web browser or other application that accesses (or requests access to) the enterprise resource 504 through the network device 506.

The enterprise resource 504 may generally include any application, database, data store, file server, web server, mail server, or other resource supported by an enterprise, including an application or the like locally hosted on customer premises, one or more remote resources, or any combination of these. In one aspect, the enterprise resource may include a protected resource such as an application secured by password access, or a zero trust network access resource accessible through a zero trust network access gateway for the enterprise network.

The network device 506 may include any network device such as a firewall, switch, wireless access point, gateway, and so forth. In general, services operating on the network device 504 may support enterprise threat management through a connection to the threat management facility 508 and the local security agent 510 executing on the endpoint

502, while also facilitating access to enterprise resources 504. The network device 506 may advantageously incorporate a hardware security system 514 such as a dedicated chip or circuit that stores data for authenticating the network device 506. For example, Trusted Platform Module (TPM) is an international standard for a dedicated hardware cryptoprocessor that specifies an architecture, security algorithms, cryptographic primitives, root keys, and authorization standards that can be used for authentication. The Trusted Platform Module is described by way of non-limiting example in International Organization for Standardization/International Electrotechnical Commission standard 11889, incorporated herein by reference in its entirety.

The TPM cryptoprocessor securely stores device-specific key material that is bound to a device at manufacture. The cryptoprocessor also supports various cryptographic functions (e.g., encryption, decryption, hashing, key generation, random number generation, etc.) for remote attestation to reliably authenticate the device on demand. In the context of a secure enterprise network, the hardware security system 514 permits the network device 506 to authenticate to the threat management facility 508 automatically or semi-automatically when the network device 506 is physically connected to a customer's enterprise network. While the Trusted Platform Module standard provides a useful and highly secure, hardware-based security system, any other standardized, proprietary, and/or commercial hardware-based security system may also or instead be used as the hardware security system 514 herein, provided the system provides suitable security, and supports remote authentication of the network device 506, e.g., from the threat management facility 508. For example, Platform Trust Technology from Intel™ and PSP fTPM from AMD™ provide similar functions and security to the TPM standard.

In one aspect, the network device 506 may include a zero trust network access gateway that provides secure connectivity for client devices, such as the endpoint 502, to a protected resource such as the enterprise resource 504. The zero trust network access gateway, may, for example, support client access via a WebSocket service and a client access port, such as a reverse proxy. The zero trust network access gateway may facilitate establishing and maintaining a connection with an endpoint-deployed local security agent 510 that is adapted for operation in a ZTNA environment. In general, the zero trust network access gateway may require authentication of endpoints 502 on a resource-by-resource basis. To this end, the system 100 may include an identity provider 514 that supports, e.g., secure, credential-based authentication of entities within the zero trust network system 500.

The threat management facility 508 may include any of the threat management facilities or other security resources described herein. The threat management facility 508 may generally support security of the enterprise network 500, including a range of administrative services such as configuring gateways, managing protected resources, configuring the identity provider 514, monitoring ZTNA appliances, creating notifications, generating reports, managing users, and the like. In one aspect, the threat management facility 508 may support security by detecting new network hardware such as the network device 506 when it is added to the enterprise network, and by authenticating the new network hardware, such as the network device 506, before permitting network traffic through the network device 506.

It will be understood that the network device 506 may itself be an endpoint 502 that is managed by the threat management facility 508. It should also be noted that an endpoint 502 such as a client or other end user device may also include a hardware security system 514 that can be used to authenticated the end user device to the threat management facility 508. Thus, while the following description generally emphasizes the authentication of an endpoint 502 generally, it will be understood that the endpoint 502 may be network hardware that has been added to the enterprise network 500, and the techniques described herein may advantageously be used to securely and reliably authenticate such new hardware when it is added, and before network traffic is permitted through the newly added network hardware.

Figure 6:
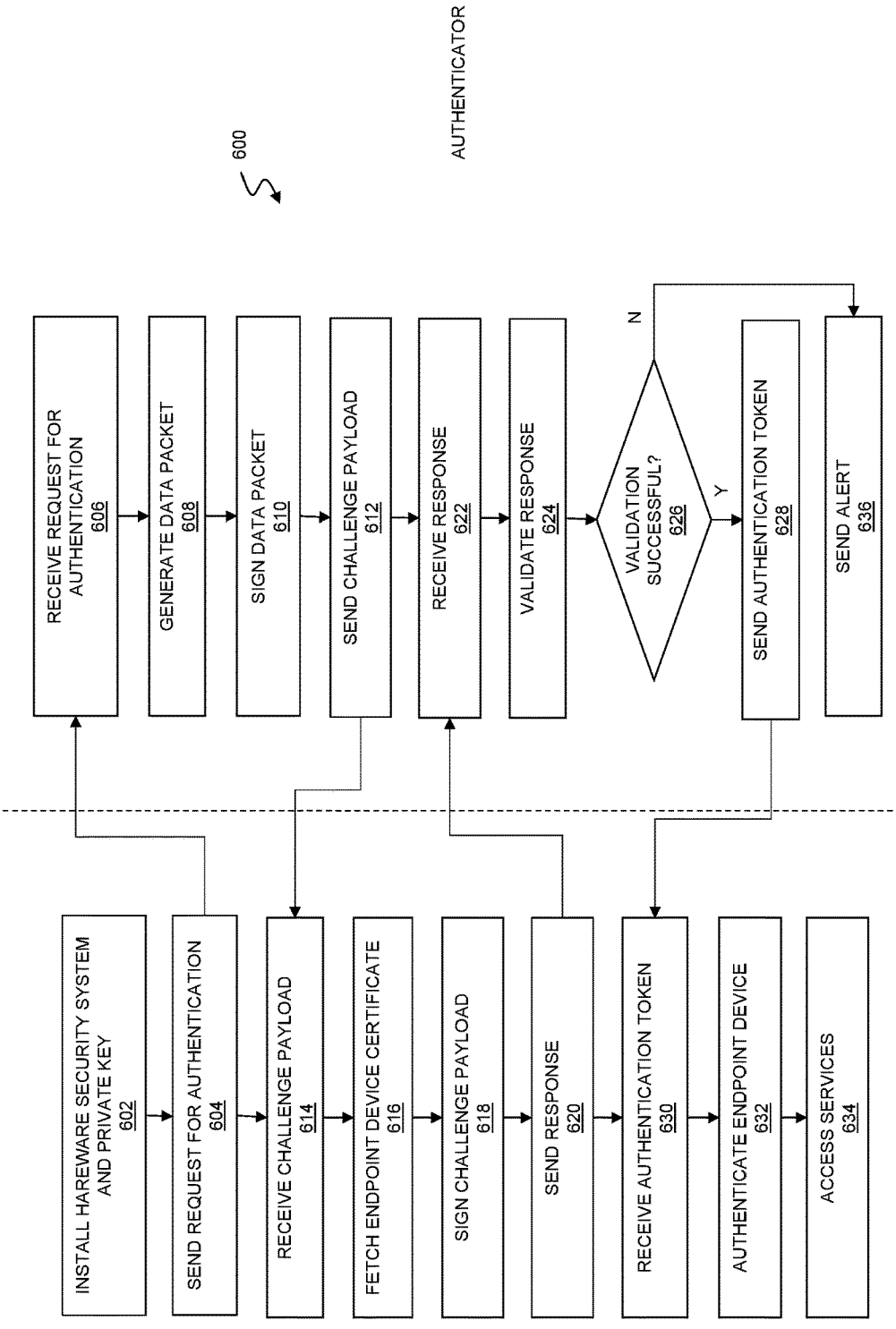
FIG. 6 illustrates a method for using a hardware-based security system to authenticate an endpoint device to a computing platform.

FIG. 6 illustrates a method for using a hardware-based security system to authenticate an endpoint device to a computing platform. The method 600 may be implemented using combinations of the devices and/or components described herein, e.g., in FIGS. 1-5. In an enterprise network such as any of those described herein, an endpoint device such as any of those described herein may be prevented from participating in the enterprise network until an authenticator at the computing platform has specifically authenticated the endpoint device at the computing platform. After the endpoint device has been authenticated, the endpoint device may receive an authentication token from the authenticator to join the enterprise network.

As noted elsewhere herein, and as illustrated in the figure, the endpoint device may be a network device such as a switch, a router, an access point, a wireless access point, a gateway, a zero trust network access appliance, a firewall, or the like. This advantageously permits secure registration of new network hardware to a cloud-based threat management facility or other remote security platform when the hardware is physically added to an enterprise network for a customer. Thus, the techniques described herein may simplify hardware installation for a customer, and concurrently improve security and manageability for a vendor that provides security services to the customer. At the same time, the techniques described herein may also advantageously be used on individual end user devices such as laptops, smart phones, desktops, tablets and the like (as well as virtual devices, where the underlying virtual computing infrastructure provides suitable hardware security), so that the end user can securely register or re-register and end user device to the threat management facility using a hardware-based security system that is bound to the end user device at the time of manufacture.

As shown in step 602, the method 600 may include installing a hardware security system and private key on an endpoint device such as any of the user devices or network devices described herein. The hardware security system may, for example, include a Trusted Platform Module chip or other dedicated cryptoprocessor, hardware security module, or the like, any of which may be deployed as a dedicated processor or a hardware-protected mode on a main processing unit. The hardware security system may securely store artifacts for authentication, such as cryptographic keys, certificates, and passwords. The hardware security system may also provide various functions to support attestation, binding, sealing, and the like, such as a cryptographic library for encryption decryption, along with other cryptographic primitives such as random number generation, public key cryptography, hashing, key generation, digital signature generation, digital signature verification, secure timekeeping, and so forth.

The hardware security system may, at the time of manufacture, be provided with one or more private keys uniquely associated with the endpoint device. In general, the hardware security system may self-generate, or may be provided with, one or more asymmetric cryptographic keys. For each such key pair, the private key may be securely stored on the hardware-based security system, and the corresponding public key may be extracted and transmitted to a suitable certificate authority for use in authenticated the device when requested. While other post-manufacture techniques may also or instead be used to securely install a key on the hardware-based security system, the opportunities for malicious intervention can be minimized by working with the certificate authority to secure a certificate for the hardware-based security system during the manufacturing process. More specifically, the hardware-based security system may digitally sign a payload with the private key, and the certificate authority can authenticate the endpoint device using the public key. Upon authentication, the endpoint device can send a certificate-signed request to the certificate authority, and the certificate authority can responsively issue an endpoint certificate that can be stored by the endpoint device in a memory the hardware-based security system.

As further described herein, subsequent registration of the endpoint device can be performed by a threat management facility or other cloud resource by validating a certificate chain in the endpoint certificate (with reference to the certificate authority), and then creating a challenge payload with the public key (which can also be retrieved from the certificate authority if desired) and validating the endpoint device based on a decrypted response thereto.

As shown in step 604, the method 600 may include sending a request for authentication of the endpoint device to a computing platform. The computing platform may, for example, be a threat management facility, cloud-based security platform, or other security resource that provides security services to an enterprise network, or that otherwise manages connections to or use of the enterprise network. For example, the computing platform may include any of the threat management facilities described herein, and/or any suitable cloud computing platform.

The authentication request may, e.g., includes a request for authentication to the computing platform to access one or more services hosted on the computing platform, such as security services hosted on a threat management facility. In some embodiments, the endpoint device may send the request upon a first access to the enterprise network, and/or in response to a boot up of the endpoint device. This approach advantageously facilitates automatic registration of a new network device when it initiates a connection to an enterprise network and/or threat management facility or the enterprise network. The request may also or instead be initiated upon expiration of a prior authentication token held by the endpoint device, or upon the occurrence of some other event. For example, a threat management facility may periodically initiate a reauthentication by the endpoint device on some predetermined interval or schedule, or the threat management facility may initiate a reauthentication upon detecting a change in security posture of the endpoint device, possible malware on the endpoint device, or some other security event indicating a possible compromise of the endpoint device. In some embodiments, a user of the endpoint device such as an administrator for the enterprise network may use a browser or remote console to manually request authentication of the endpoint device at the computing platform. Similarly, where the endpoint device is an end user device, a user at the endpoint device may manually initiate the request locally on the endpoint device.

As shown in step 606, the method 600 may include receiving the request for authentication at the computing platform. For example, this may include receiving the request at an authenticator, which may include software hosted at the computing platform, or any other suitable software or hardware suitable for receiving and processing a request for authentication as described herein. In general, the authenticator may be responsible for managing access to and/or use of the enterprise network by authenticating devices (or users of devices) in response to incoming authentication requests at the computing platform.

As shown in step 608, the method 600 may include generating a data packet at the authenticator. The data packet may include a random data segment such as output from a random number generator, along with a date, a time, a hash of other data, or any other data or combination of data from various sources available to the authenticator.

As shown in step 610, the method 600 may include signing the data packet with a key for the authenticator, thereby providing a digital signature. To this end, the authenticator may retrieve the key from a secure database at the computing platform or any suitable remote platform, and then sign the data packet with a digital signature, thus providing a signed data packet that is verifiably generated by the authenticator and/or computing platform. The database may store authentication data for the computing platform, such as a private key for an asymmetric key pair that is used to assert the identity of the authenticator and/or computing platform, e.g., by digitally signing a random data segment.

As shown in step 612, the method 600 may include sending a challenge payload to the endpoint device. In general, the challenge payload may be generated by combining the data packet and the digital signature. This permits external verification (e.g., by the network device) that the challenge payload is from the authenticator by retrieving a public key in the asymmetric key pair to the challenge payload. The challenge payload may also or instead include supplemental data such as a location of the public key, and expiry for the challenge payload, and so forth.

As shown in step 614, the method 600 may include receiving the challenge payload at the endpoint device from the computing platform. In one aspect, the challenge payload may be initially validated by the endpoint device, e.g., to ensure that the challenge payload is a valid challenge payload from the computing platform.

As shown in step 616, the method 600 may include, in response to receiving the challenge payload at the endpoint device, fetching the endpoint device certificate from hardware-based security system on the endpoint device. This may, for example, include a suitable call to the hardware-based security system for retrieval of the endpoint device certificate.

As shown in step 618, the method 600 may include signing the challenge payload with the hardware-based security system. This may, for example, include creating a digital signature using a private key securely stored in the hardware-based security system, along with cryptographic functions provided by the hardware-based security system. The digital signature is a second digital signature different than the first digital signature generated by the authenticator for the challenge payload. The endpoint device certificate may include a public key for cryptographically verifying the second digital signature. It will be understood that, in one aspect, creating the second digital signature may require two or more cryptographic keys. For example, the Trusted Platform Module uses a second key to "seal" the private TPM keys and ensure that they are only used when other security requirements are satisfied.

As shown in step 620, the method 600 may include sending a challenge response from the endpoint device to the computing platform based on the challenge payload. The challenge response may, for example, include one or more of the endpoint device certificate, the challenge payload, and the second digital signature. Other data, such as an endpoint device identifier, time or date of expiration of the challenge response, and so forth, may also or instead be included to facilitate secure authentication of the endpoint device to the computing platform.

As shown in step 622, the method 600 may include receiving the challenge response to the challenge payload from the endpoint device at the computing platform.

As shown in step 624, the method 600 may include validating the challenge response to the challenge payload. Validating the response may include determining the validity of the response with one or more validation tests of the challenge response. In some embodiments, the validation tests may include cryptographically validating a certificate chain for the endpoint device certificate using one or more private keys of the computing platform (e.g., to verify the challenge payload), one or more public keys of the hardware-based security system (e.g., to verify the second digital signature), or some combination of these. For example, the authenticator may first establish a certificate chain with the endpoint device certificate and certificate data or other secrets from a secure storage connected to the computing platform. The endpoint device certificate may then be reliably used to provide (or identify a source for) the public key for the hardware-based security system, which may then be used to validate the second digital signature on the challenge response. With the hardware-based security system thus validated, the first digital signature for the challenge payload may also be validated to confirm that it was the same challenge payload sent to the endpoint device. The computing platform may also or instead confirm that the challenge payload and/or response are validated within an expiry time for the challenge payload.

As shown in step 626, if the validation of the challenge response is successful, the method 600 may include sending an authentication token to the endpoint device in response, as shown in step 628. This may include generating any suitable authentication token and communicating the authentication token to the endpoint device. This authentication token used to verifiably assert the identity of the endpoint device when communicating with the computing platform. In one aspect, the authentication token may have a limited session time of use. For example, the authentication token may have a session time of an hour or less. In some embodiments, the authentication token may be cryptographically signed, securely transmitted to the endpoint device, and/or otherwise secured against malicious attacks.

As shown in step 630, the method 600 may include receiving the authentication token at the endpoint device from the computing platform in response to the challenge response. The authentication token may be any token suitable for transmitting verifiable information about the identity of the endpoint device. For example, an authentication token may include a header defining the token type (and optionally, a digital signature algorithm). The authentication token may also include a payload that defines, e.g., a token issuer, a token user, token expiration details, and so forth. The authentication token may also include a digital signature (e.g., a third digital signature different than the first and second digital signatures) for verifying authenticity of the token and accuracy of the token contents. After the endpoint device receives the authentication token, the endpoint device may store the authentication token for the duration of a session time of the authentication token. The authentication token may be erased or otherwise disposed of after the session time expires.

As shown in step 632, the method 600 may include authenticating the endpoint device, e.g., by presenting the authentication token to the computing platform, or the authenticator of the computing platform, when (or before) requesting access to services of the computing platform. The computing platform may identify the endpoint device based on the authentication token and permit access to the services of the computing platform based on the authentication token. As described herein, this advantageously permits no-touch deployment of managed network devices. For example, devices such as gateways, firewalls, switches, routers, access points, and so forth, can be added to an enterprise network in a manner that permits secure, automatic registration to, and management by, a threat management facility or other security service(s). Where the endpoint device is an end user device, the authenticator may also prompt a user of the device with additional security challenges such as multi-factor authentication using an online authenticator, email authentication, text message authentication, security questions/phrases, biometric authentication, one-time passcodes, or any other additional authentication factor(s) suitable for the desired level of security for the application. Authenticating the endpoint device may be a binary decision where the endpoint device may be granted access to all the services at the computing platform or may not be granted access at all. Alternatively, the authenticator may allow access to a partial list of the services, network locations, resources, and the like based on the authentication token and/or the (authenticated) identity of the device.

As shown in step 634, the method 600 may include accessing services of the computing platform (and/or an enterprise network managed by the computing platform) from the endpoint device based on the authentication token. In some embodiments, the services may include cloud computing services for managing data in a cloud. In some embodiments, the services may include security services. In some embodiments, the computing platform may manage use of the services at the computing platform based on the authentication token or any suitable identifier of the endpoint device. For example, the authentication token may be matched with user preferences or security policies stored at the computing platform, which may be used to administratively manage access to services and/or network locations by the endpoint device. It will be understood that, in this context, accessing services of the computing platform may also or instead include receiving services pushed from the computing platform. For example, where the computing platform includes a threat management facility and the endpoint device is a network device in an enterprise network, the computing platform may push configuration information, enterprise policies, updates, and any other security information or enterprise network information and the like, to the endpoint device after authenticating the identity of the endpoint device as described herein.

Returning to step 626, when validation of the challenge response is unsuccessful, the method 600 may include sending an alert from the computing platform, as shown in step 636. This may, for example, include an alert to the endpoint device, an alert to an administrator for the enterprise network, or an alert to an automated security service for the enterprise network, which may responsively initiate remedial action, e.g., to quarantine the endpoint device, notify an administrator or the failed authentication, request re-authentication, withhold authentication for a predetermined interval, or otherwise address the failed authentication. The failure may, for example, include a failure to validate the certificate chain, a failure to validate the second digital signature, an expiration of an expiry time for any of the digital signatures in the certificate chain, and so forth.

It is to be appreciated that the steps of method 600 may be repeated to maintain continued authentication with the computing platform. For example, upon a reboot of the endpoint device, an expiration of the authentication token, or reconnection by the endpoint device to the enterprise network, the method 600 may return to step 604 where the endpoint device may send a new request for authentication using the hardware-based security system. The steps of method 600 may then be repeated as necessary for the endpoint device to reconnect to the computing platform and/or enterprise network.

Figure 7:
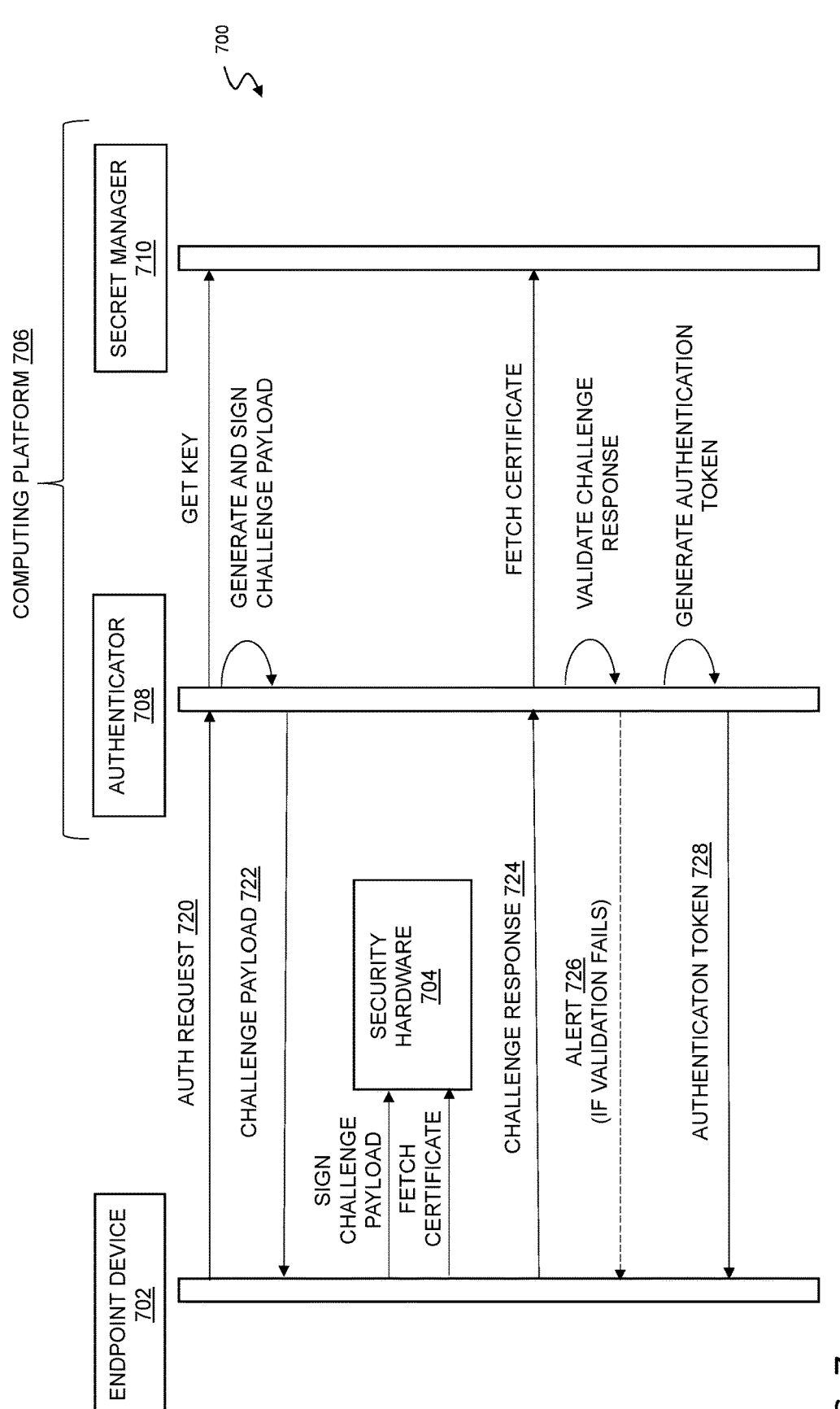
FIG. 7 illustrates a system using a hardware-based security system to authenticate an endpoint device to a computing platform.

FIG. 7 illustrates a system using a hardware-based security system to authenticate an endpoint device to a computing platform. In general, a system 700 may include an endpoint device 702, security hardware 704 on the endpoint device, and a computing platform 706 including an authenticator 708 and a secret manager 710, which may collectively employ, e.g., the method 600 described above with reference to FIG. 6 in order to provide hardware-based authentication of an endpoint device such as a network device to a computing platform such as a cloud-based threat management facility, and which may be realized using any of the endpoint devices, security hardware, computing platforms, authenticators, and secret managers described herein.

The endpoint device 702 may be any of the endpoints, compute instances, or other endpoint devices described herein. The endpoint device 702 may include a network device such as a gateway, zero trust network gateway, firewall, switch, router, access point, wireless access point, or other network device described herein, any of which may be connected to an enterprise network such as any of those described herein and managed by a threat management facility or other computing platform. The endpoint device 702 may include security hardware 704 such as a Trusted Platform Module processor or any of the other hardware-based security systems described herein. While positioned in the figure between the endpoint device 702 and the authenticator 708 for convenience, it will be understood that the security hardware 704 will typically be hardware that is physically installed on and configured with the endpoint device 702 at the time of manufacture of the endpoint device 702.

The computing platform 706 may include any combination of hardware and/or software for running one or more services. The computing platform 706 may also or instead include cloud-based services, microservices, Software as a Service (SaaS) services, virtualized computing devices, and the like, any of which may be configured to provide the computing platform 706 and components thereof. In some embodiments, the computing platform 706 may include and/or be deployed on a threat management facility such as any of the threat management facilities described herein. The authenticator 708 of the computing platform 706 may provide a front end for authenticating devices to the computing platform 706. The secret manager 710 may include a local and/or remote secure repository of keys, security artifacts, or other secrets or the like used for cryptographically-based authentication, and may generally support the authenticator 708 by providing access to the secrets as needed during an authentication process. For example, the secret manager 710 may include one or more data stores hosted at the computing platform 706 (e.g., a threat management facility such as any described herein), or an interface to a remote repository or cloud service such as a certificate authority, trusted resource, secure database, or the like. The authenticator 708 may also be hosted on the computing platform 706, and may include any software, hardware, or combination of these configured to manage access to one or more services of the computing platform 706, and or for managing access to an enterprise network that is managed by the computing platform 706. The services of the computing platform may, for example, include one or more cloud services, threat management services, software-as-a-service applications, data storage, zero trust network access applications (or ZTNA gateways for same), and so forth. In some embodiments, the authenticator 708 may be configured as a cluster of network devices or nodes.

As illustrated in FIG. 7, the endpoint device may send a request 720 for authentication to the authenticator 708 of the computing platform 706. The request 720 may be sent upon detection of a reboot of the endpoint device 702 or an expiration of a previous authentication token. The request 720 may include a request for a challenge payload 722 from the computing platform. The authenticator 708 of the computing platform 710 may receive the request 720. In response to the request 720, the authenticator 708 may generate and sign the challenge payload 722 with a key from the secret manager 710 to provide a first digital signature. The authenticator 708 may send the signed challenge payload 722 to the endpoint device 702, which may in turn sign the challenge payload 722 using the security hardware 704. The endpoint device 702 may also fetch an endpoint device certificate from the security hardware 704, and may then send a challenge response 724 to the authenticator 708 including, e.g., an endpoint device certificate, the challenge payload 722, and a digital signature for the challenge payload 722 from the security hardware 704.

Upon receiving the challenge response 724, the authenticator 708 may validate the challenge response 724, e.g., by verifying an expiry of the challenge payload 722, the first digital signature, the second digital signature, and the endpoint device certificate. To validate the endpoint device certificate, the authenticator 708 may fetch an authenticator certificate from the secret manager 710 and validate a certificate chain with the endpoint device certificate. Upon successful validation of the challenge payload, the authenticator 708 may generate an authentication token 728 and send it to the endpoint device 702. The endpoint device 702 may then access services at the computing platform 706 with the authentication token 728. Alternatively, if the authenticator 708 is unable to validate the challenge response 724 as described herein, the authenticator 708 may communicate an alert 726 to the endpoint device 702. The authenticator 708 and/or endpoint device 702 may also initiate remedial action if/as necessary based on the nature of the failed validation of the challenge response.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for operating a computing platform to authenticate an endpoint device at the computing platform, the method comprising:

receiving a request from the endpoint device for authentication at the computing platform, wherein the endpoint device is a network device for an enterprise network managed by the computing platform and the computing platform is a threat management facility;

generating a data packet;

signing the data packet with a key, thereby providing a first digital signature;

sending a challenge payload to a hardware-based security system on the endpoint device, the challenge payload including the data packet and the first digital signature;

receiving a response to the challenge payload from the endpoint device, the response including an endpoint device certificate, the challenge payload, and a second digital signature for the challenge payload from the endpoint device;

validating the response to the challenge payload by:

validating a certificate chain for the endpoint device certificate, validating the second digital signature for the challenge payload, and validating an expiry of the data packet in the challenge payload;

in response to validating the challenge payload, sending an authentication token to the endpoint device for access to security services of the computing platform for the enterprise network;

in response to an unsuccessful validation of the response to the challenge payload, generating a security alert to address a failed authentication; and in response to an expiration of the authentication token, reauthenticating the endpoint device without a refresh token by transmitting a second challenge payload to the hardware-based security system on the endpoint device.

2. The method of claim 1 wherein validating the second digital signature for the challenge payload includes validating the second digital signature with a public key associated with the endpoint device certificate.

3. The method of claim 1, further comprising sending an alert to the endpoint device in response to a first failure to validate the certificate chain or a second failure to validate the second digital signature.

4. The method of claim 1, wherein the method further includes receiving a reauthentication request at the computing platform when the authentication token has expired.

5. The method of claim 1, wherein the computing platform includes a cloud computing platform.

6. The method of claim 1 wherein validating the response to the challenge payload includes validating a second expiry of one or more digital signatures in the certificate chain for the endpoint device certificate.

7. The method of claim 1, wherein the authentication token allows access to a partial list of at least one of services, network locations, and resources.

8. A method for operating an endpoint device to authenticate the endpoint device at a computing platform, the method comprising:

sending a request for authentication to the computing platform, wherein the computing platform is a threat management facility;

receiving a challenge payload from the computing platform;

fetching an endpoint device certificate from a hardware-based security system on the endpoint device, wherein the endpoint device is a network device for an enterprise network managed by the computing platform;

signing the challenge payload with a digital signature from the hardware-based security system;

sending a challenge response to the computing platform based on the challenge payload, the challenge response including the endpoint device certificate, the challenge payload, and the digital signature;

receiving an authentication token for access to security services of the computing platform for the enterprise network from the computing platform in response to the challenge response;

authenticating the endpoint device at the computing platform with the authentication token;

in response to an expiration of the authentication token, reauthenticating the endpoint device without a refresh token by transmitting a second challenge payload to the hardware-based security system on the endpoint device; and accessing services of the computing platform from the endpoint device with the authentication token.

9. The method of claim 8, wherein the challenge payload includes a random data segment and an expiration date.

10. The method of claim 9, wherein the challenge payload includes a second digital signature for the random data segment from the computing platform.

11. The method of claim 10, further comprising validating the computing platform at the endpoint device with the second digital signature and the random data segment.

12. The method of claim 8, wherein sending the request for authentication includes sending a reauthentication request in response to an expiration of a prior authentication token.

13. The method of claim 8, wherein sending the request for authentication includes sending the request for authentication in response to a boot up of the endpoint device.

14. The method of claim 8, wherein the authentication token has a valid time of an hour or less.

15. The method of claim 8, further comprising sending a second request to the computing platform in response to an expiration of the authentication token.

16. The method of claim 8, wherein the hardware-based security system includes a trusted platform module, the method further comprising installing the trusted platform module and the endpoint device certificate in a trusted platform module chip during manufacturing of the endpoint device.

17. The method of claim 8, wherein the endpoint device includes security hardware for the enterprise network.

18. The method of claim 8, wherein the endpoint device includes at least one of a gateway, a firewall, a wireless access point, and a switch.

19. A system comprising:

an endpoint device connected to an enterprise network, wherein the endpoint device is a network device for the enterprise network; and a computing platform including an authenticator embodied in computer executable code stored in a non-transitory computer readable medium for managing access by the endpoint device to the computing platform, wherein the computing platform is a threat management facility, and wherein the authenticator is configured:

to receive a request from the endpoint device for authentication at the computing platform, to generate a random data segment, to send the random data segment to the endpoint device, to receive a response data packet from the endpoint device, to determine a validity of the response data packet with one or more cryptographic validation tests of the response data packet, to send an authentication token to the endpoint device for access to security services of the computing platform for the enterprise network if the response data packet passes the one or more cryptographic validation tests, and in response to an expiration of the authentication token, to reauthenticate the endpoint device without a refresh token by transmitting a second challenge payload to a hardware-based security system on the endpoint device.

20. The system of claim 19, wherein the authenticator is configured to allow access to a partial list of at least one of services, network locations, and resources based on the authentication token.

\* \* \* \* \*